INVENTOR.
JAMES W. HUGHES
BY
ATTORNEY.

Sept. 20, 1932.  J. W. HUGHES  1,878,520
RIVETING MACHINE
Filed May 6, 1929  6 Sheets-Sheet 2

INVENTOR.
JAMES W. HUGHES
BY
ATTORNEY.

Sept. 20, 1932.　　　J. W. HUGHES　　　1,878,520
RIVETING MACHINE
Filed May 6, 1929　　　6 Sheets-Sheet 3

INVENTOR.
JAMES W. HUGHES
BY
ATTORNEY.

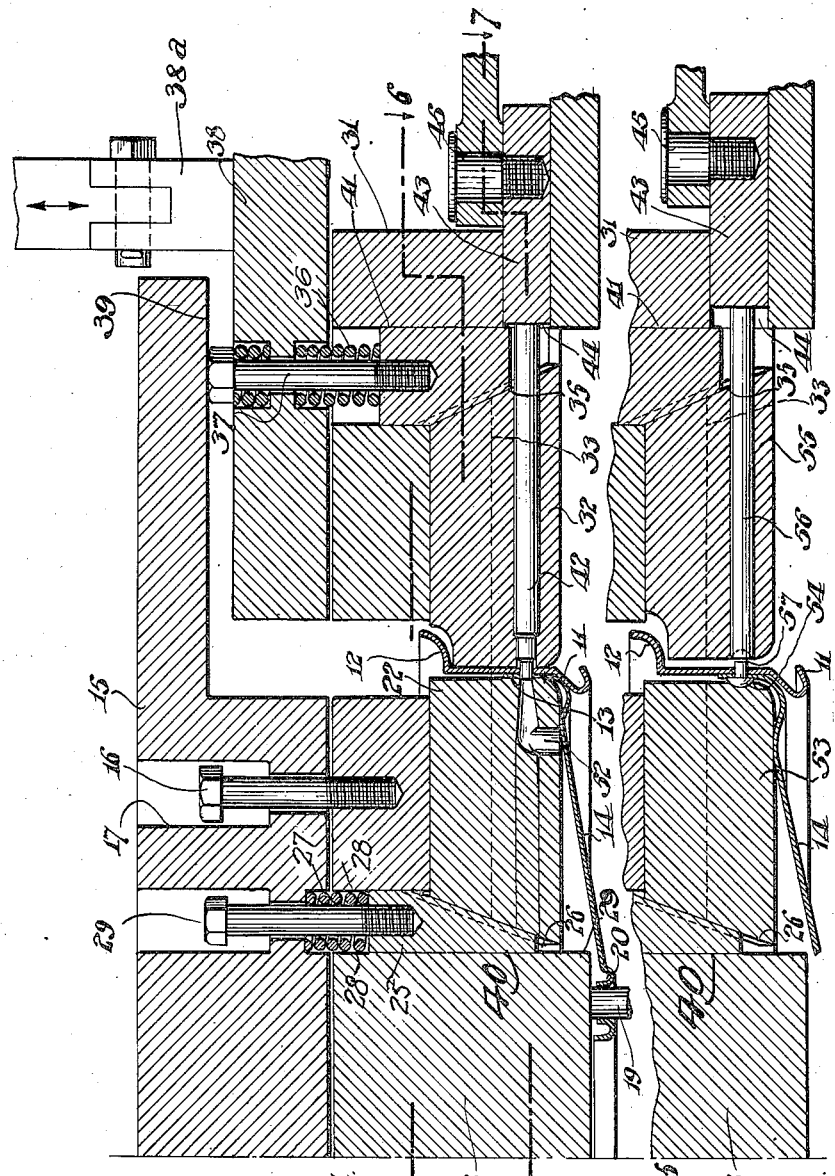

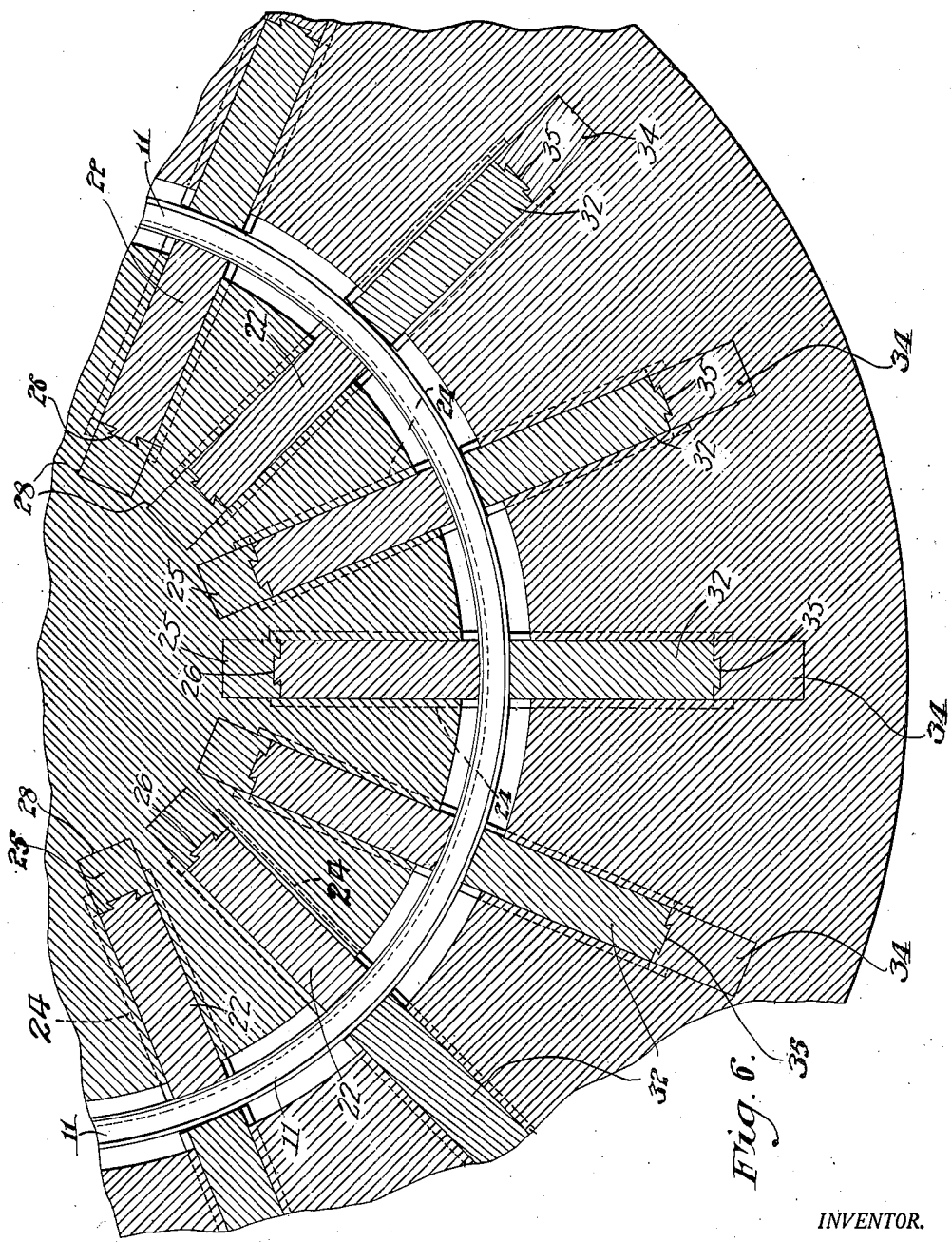

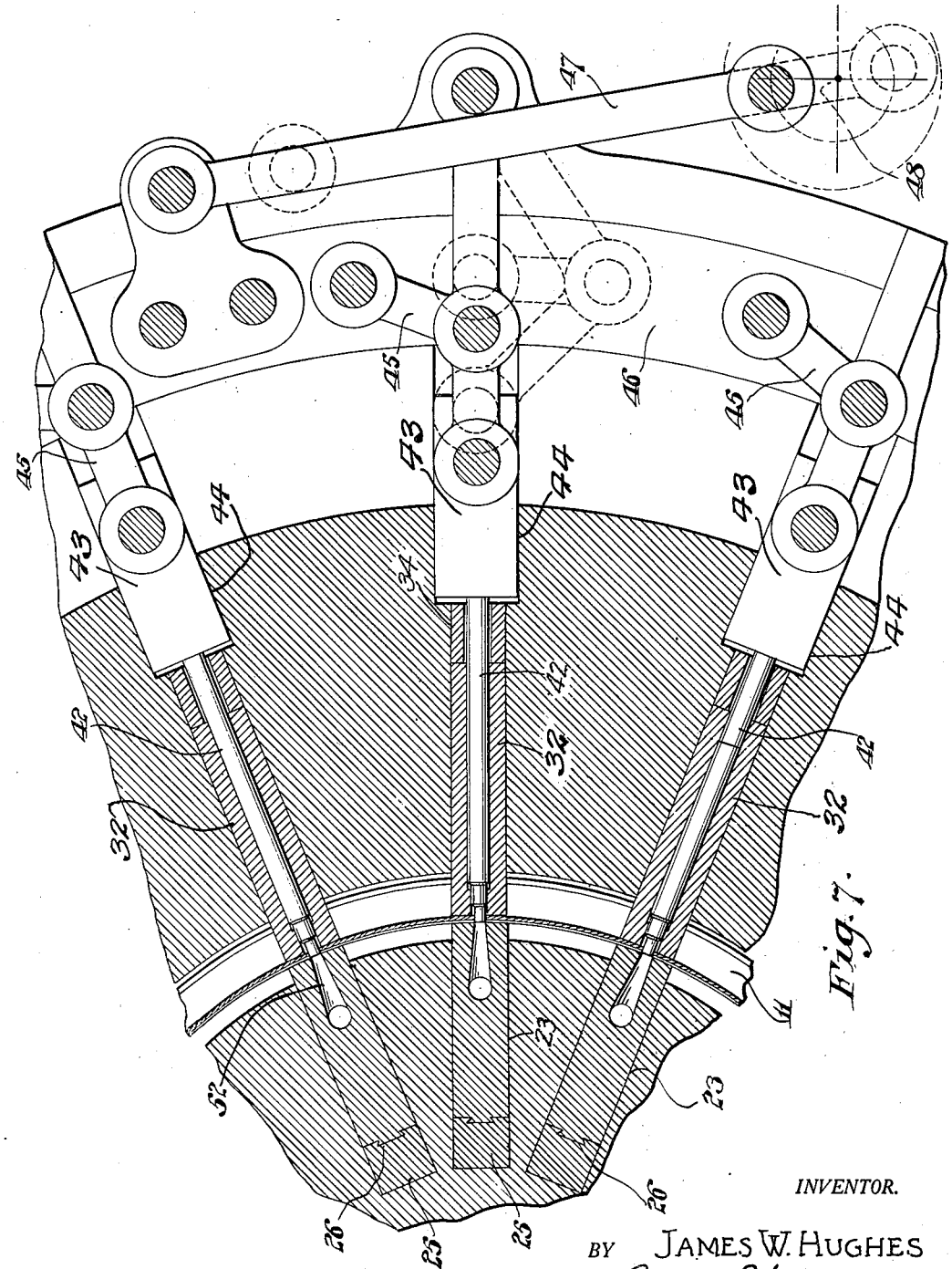

Patented Sept. 20, 1932

1,878,520

UNITED STATES PATENT OFFICE

JAMES W. HUGHES, OF DETROIT, MICHIGAN, ASSIGNOR TO BUDD WHEEL COMPANY, OF PHILADELPHIA, PENNSYLVANIA, A CORPORATION OF PENNSYLVANIA

RIVETING MACHINE

Application filed May 6, 1929. Serial No. 360,725.

The machine for performing riveting operations which I have invented is a machine having an adaptation especially to the performing simultaneously of a number of riveting operations in annular series, and has particular adaptation to the riveting of wheel rims or fellys to wheel bodies. The annular series of operations may be any of those connected with riveting, as for example, locating, clamping, punching, feeding, rivet upsetting and the like. The machine has a special adaptation for combination with other machinery in an automatic line for the complete machine fabrication of wheels.

In such automatic line the work is transmitted from one operation to another by a conveyor of special construction. Such an automatic line is disclosed in my co-pending application Serial No. 34,743, filed June 3, 1925. The primary object of my invention is an invention of a machine which can be most effectively combined and operated with the conveyor and remaining machines of such an automatic line.

Other objects have had their weight in the evolution of the invention, such for example, as the efficiency of the riveting operations per se, the power economy, the accuracy of the work, compactness of the machine at large, complete accessibility for interior annular work, and the intimate relation of accuracy to riveting operations of the different orders which may be carried out, each order at a different location on the automatic line.

These and other objects of my invention are attained through a construction comprising primarily riveting operations members (that is to say, members of themselves performing directly principal or auxiliary operations upon the work having directly to do with ultimate riveting) movable toward and from the work yieldingly, together with relatively fixed abutting means unyieldingly retaining said operating members in work engagement when moved thereinto. The yieldingly moved operating members prevent undue or asymmetrical distortion of the work, particularly light work, while the unyielding retention of the operating members once engaged provides for all necessary forces of reaction against the major forces of operation. Thus for example, an anvil or die operations member is yieldingly moved into engagement with the work, and unyieldingly retained in such engagement against the operations force of a punch, or a second die member.

Wedge means constitute the preferred type of means for moving the operating members into and out of working engagement, the wedges themselves being actuated under spring pressure. These wedges are arranged, and are particularly adapted to be arranged, for actuating operations members arranged in annular series as required for simultaneous performance of riveting operations on wheels and similar such work. Especially is this true of the interiorly engaging operations members which must be embodied in space of limited compass.

Retaining abutments common to the annular series of operating members, operating means common to a plurality of such series, and independent means for operating riveting punches constitute other features, assisting particularly in the adaptation to wheels and to combination in the automatic line.

In the accompanying drawings I show but one embodiment of my invention. It should already be apparent that it is susceptible of a plurality of embodiments.

Of these drawings,

Figs. 1 to 4 are all axial cross sections showing those portions of the principal members of the machine lying one one side of its axis of symmetry. The differences between them is merely that they show the parts in various positions as will be described.

Fig. 5 is a similar such view showing the operations members in the form of an anvil clamp and a riveting punch instead of in the form of a die, and clamp and a perforating punch.

Fig. 6 is a cross sectional plan view on lines 6—6 of the machine showing the parts in the attitudes shown in Fig. 4.

Fig. 7 is a similar sectional plan view on the line 7—7 of Fig. 4.

Figure 1:
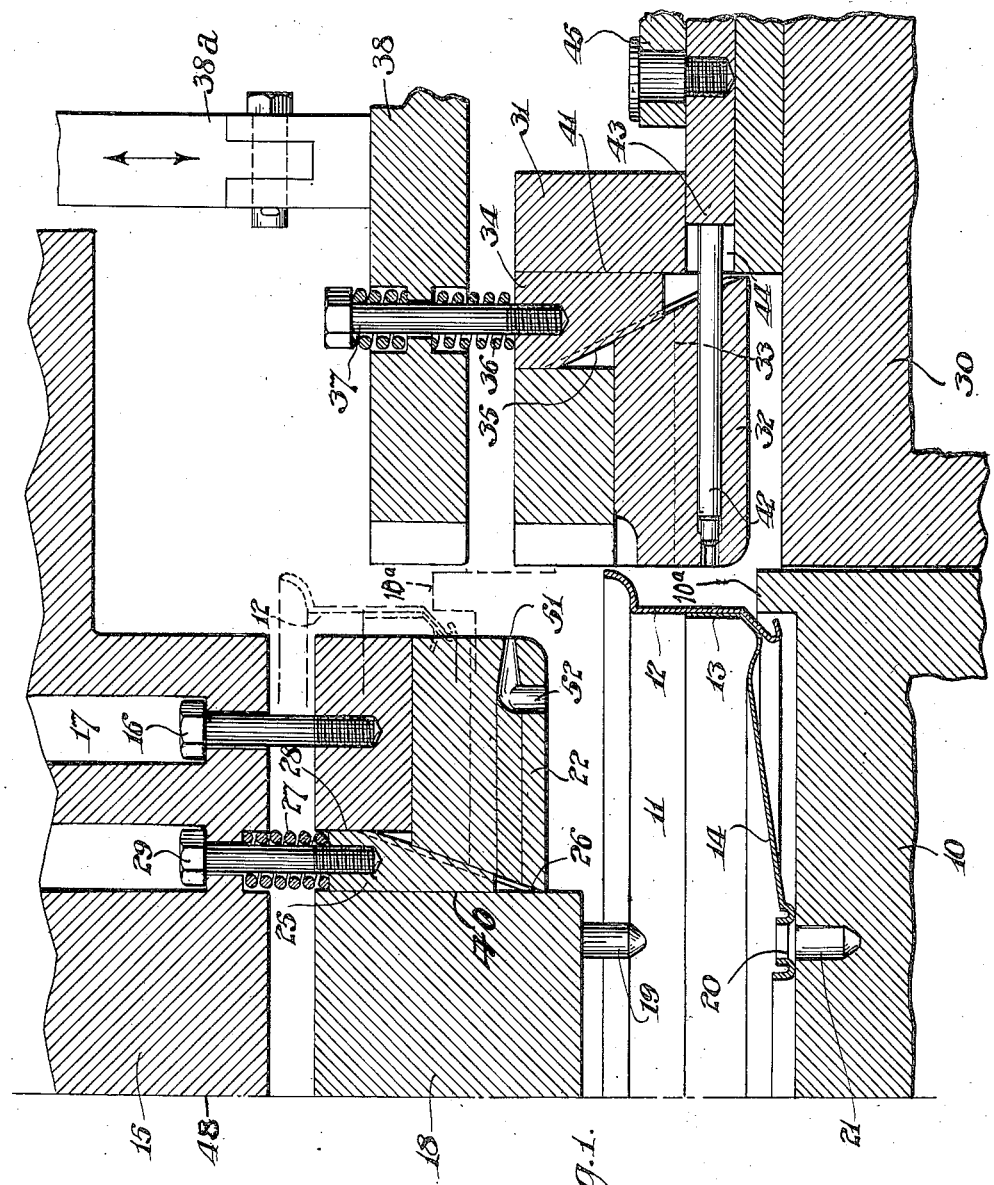
Figure 2:
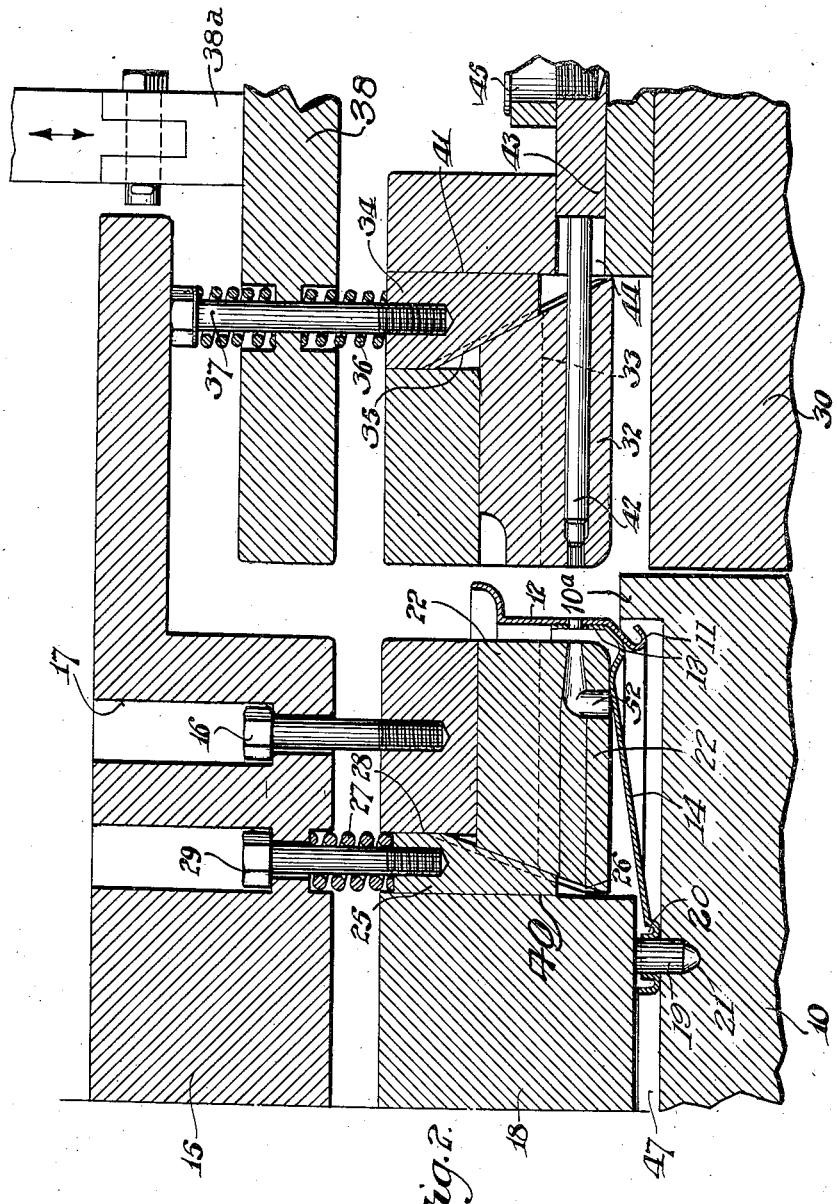
Figure 3:
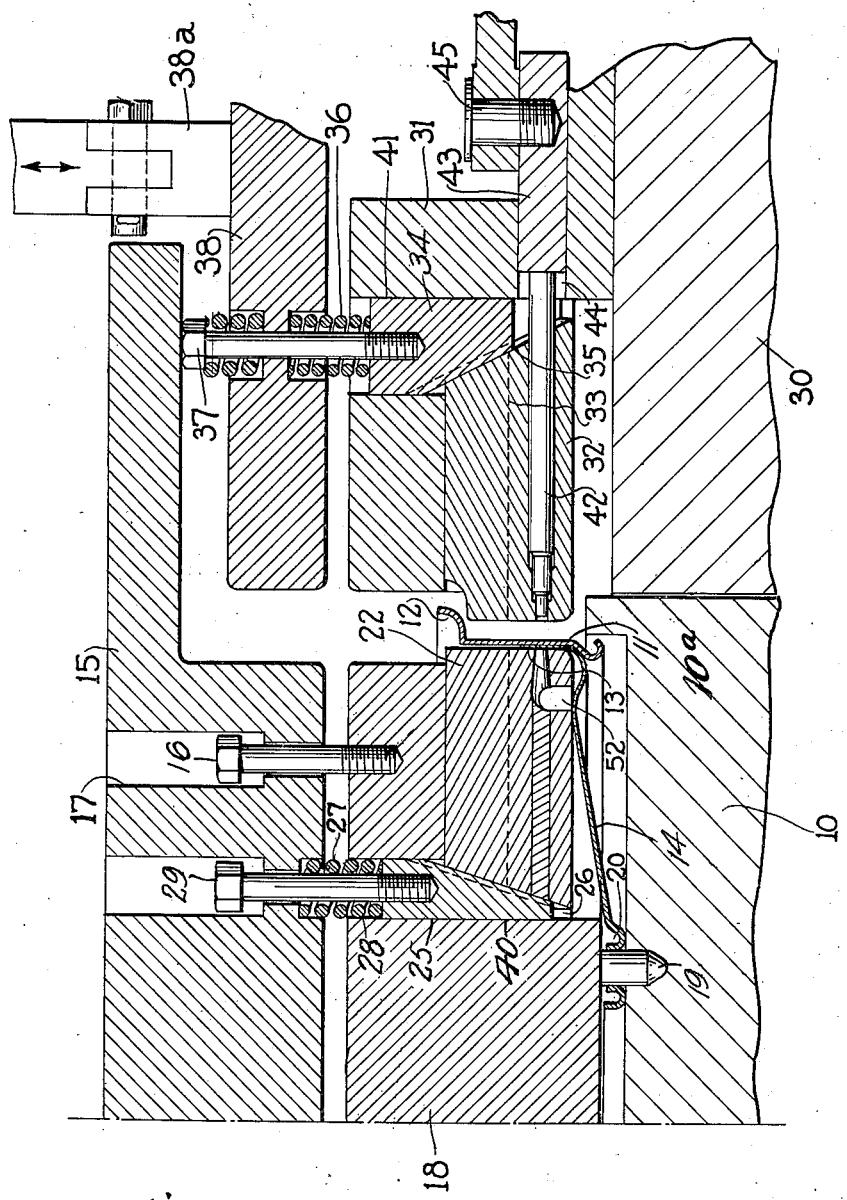

Referring first to Fig. 1, 10 is a work receiving table or head associated in any desired manner with the conveyor of the automatic line described in my application above referred to. It is preferably the head of a hydraulic ram ejected in the pathway of the conveyor system in the same manner as are the heads of hydraulic rams ejected in the beds of die presses for the purpose of reception and ejection of die stampings. It is sufficient for the purposes of understanding of this invention to contemplate the head 10 as vertically reciprocable from the upper position shown in dotted lines in Fig. 1 where it lies in approximate alignment with the conveyor pathway and receives the work in its lower full line position. These devices are sometimes hydraulic or compressed air cushions, depending upon the source of power with which they are operated. They are well known in the industry.

The work shown is a wheel 11, the rim 12 of which is to be attached to the flange 13 of a disc 14 which constitutes the body of the wheel. The following annular series of riveting operations are to be performed, first, piercing of holes in the rim 12 and the flange 13; second, feeding of rivets into the pierced holes (the machine for this operation is shown in another application filed May 4, 1931, Serial No. 360,389); third, the heading over of the rivets so fed. From an auxiliary standpoint these operations include work clamping, work piercing, rivet feeding, rivet retaining, work clamping and rivet heading.

Axially reciprocable with respect to the work 11 is an overlying working head 15. Suspended from this head through a lost motion connection constituted by bolts 16 working in slot 17 of the head, is an abutment member 18. This abutment member carries in its central portion a plurality of depending centering pins 19 adapted to pass through bolt holes 20 in the disc 14, and enter registering centering sockets 21 in the table 10. Outwardly removed from pins 19 the head 18 carries an annular series of radially reciprocable operations members 22. In Figs. 1 to 4 these are in the form of female piercing dies.

These members 22 are radially aligned and guided for radial reciprocation upon the abutment member 18, by mounting in radial slots 23, and vertical retention in those slots by the radial tongue and groove connections 24. They are yieldingly movable toward and from engagement with the inner surface of the flange 13, by means in the form of wedges 25 having a positive two-direction operating connection with their rear ends in the form of a dovetail 26, and a wedge actuating spring 27 bearing on the heads of the wedges 25. The springs 27 are confined upon bolts 29 threaded into the wedges and having a lost motion connection with the general operating head 15 of the machine.

These wedges 25 are mounted for axial reciprocation under the motivation of springs 27 in axially extending parallel walled slots 28 arranged in annular series in the abutment member 18 and engaging the complemental parallel walls of the wedges. The operations face of the wedge provided with the tongue and groove connection 26 is complementally inclined for sliding engagement with the inclined rear end of the operations member 22. The opposite face of the wedge from the tongue and groove face 26 has axial engagement with the extended abutting wall 40 of the abutment member 18. Through this engagement with the abutment wall 40, the wedges yieldingly moved into working engagement through the springs 27 are unyieldingly held in work engagement.

Without the table 10 is an annular machine base 30 relatively fixed as respects the work and the parts of the machine just described. On this base is mounted without the periphery of the work 11 an encircling annular abutment member 31. On its under side it carries in a manner similar to the carriage of operations members 22 by the central abutment member 18, a corresponding external annular series of radially reciprocable operations members 32. These, in Figs. 1 to 4 and 5 are in the form of work clamps. Their axial retention is by means of the tongue and groove connections 33. Like the operations members 22, they are yieldingly operated into and out of work engagement by an annular series of wedge means 34 having the inclined dovetail connection 35 with their rear ends and moved by the springs 36 confined upon bolts 37. But these bolts 37 have lost motion connection with an overlying annular supporting member 38 which floats upon the springs 36. The member 38 in turn is reciprocated through a linkage 38ª actuated like the head 15 from the main drive of the machine. It corresponds to the hold-down member of a double acting press and its movements can therefore be timed relatively to the movement of head 15. Also, like the interior series of operations members 22 exterior operations members 32 are retained in work engagement when moved thereinto by a common abutment wall 41 engaged by the parallel adjoining faces of the wedges 34. The general arrangement, mounting, retention and operation of the internal series of wedge means 25 and external series of wedge 34 is essentially similar.

Borne in aligning bearings and projecting through the operations members 32 (shown as clamps) are radially reciprocable piercing punches 42 adapted to be projected into and out of engagement with the work through the work engaging face of the operations members 32. These punches extend radially outwardly to cross heads 43 radially guided in abutment members 31 through complementally walled slots 44. They are commonly reciprocable by connection through toggles 45 with a common axially oscillatable ring 46, oscillated by a link connection 47 with a power driven crank 48. The ring 46 may be mounted on any suitable bearings (not shown), and supported in any suitable manner from the base 30 of a machine.

In operation the head 15 may be axially reciprocated by any suitable and well known means. The particular mechanism employed to effect this movement is not shown, but any of the usual and well known crank or cam devices may be used for this purpose. The head 10 is raised in its cycle of movement to the dotted line position shown in Figure 1, in which the centering pins 19 are above the path of movement of the work into the machine, this path of movement lying, in general, in a plane approximately at right angles to the axis 48 of the machine. With the parts in this position the work is moved in this plane at right angles to the axis between the abutment member 18 and the then raised table 10 of the hydraulic cushion. It is received by the table 10 and tentatively approximately centered by the annular upstanding rim 10ª of this table. The progressing of the cycle of movement of the operating head 15 then lowers the abutment member 18 in spaced relation to head 15 as defined by the lost motion connection 16, 17 until the centering pins 19 pass through the bolt holes 20 and into the registering sockets 21 and thereby accurately center the work as respects the operations members of the machine at large. The dead weight of the abutment member 18 and the lowered or relieved pressure of the hydraulic cushion 10 (as is common practice in die machinery) carries the work 11 and the table 10 downwardly and the parts and the work into the relative positions shown in Fig. 2. Here the table 10 reaches a positive stop (as is common practice in die machinery). Still further downward movement of the operating head 15 compresses the motivating springs 27 acting on the heads of the wedges 25 and thereby yieldingly moves the interior series of operating members 22 radially outwardly into engagement with the interior face of the flange 13 of the disc, as clearly appears in Fig. 3. Such yielding engagement limits the engaging pressure and thereby limits the distorting forces which might result in temporary distortion of the work, affecting accuracy of the riveting operations, or in permanent distortion affecting final dimension. The strength of the motivating springs 27 can be adjusted both by choice of spring and by adjustment of lost motion between the common operating head 15 and the common abutment member 18. So moved into yielding engagement with the work, the operations members 22 are unyieldingly held in such positions against opposing forces by the abutment walls 40 of the common abutment member 18. It should be noted that the centering pins 19 engage in the bottoms of the sockets 21 and thereby constitute stoppage for the abutment member 18 and take the counterthrust of motivating springs 27 so far as need be. On the other hand, the bottom face of the member 18 may take this thrust upon the reinforced central portion 47 of the disc 14. if desired.

During the latter portion of this same downward movement of the head 15 effecting the work engagement of the operations members 22 or that portion immediately following such work engagement, suspension ring 38 of the outer series of operations members 32 is moved downwardly. (See Fig. 2.) Its furtherance appears in Fig. 3 where inner annular series of operations members 22 is shown in work engagement and the outer annular series of operations members 32 is shown well on its way toward work engagement. The final downward movement of the member 38 effects compression of the motivating springs 36 as shown in Fig. 4, and final yielding movement of the outer annular series of members 32 into work engagement. There these members are unyieldingly retained through the common abutting walls 41. Preferably there is a slight dwell of the common operating heads 15 and 38 at this juncture. At least if cranks be used the final movements are of a very minor order and quite insufficient to disturb the relations of the parts as appearing in Fig. 4. So, the work is effectually clamped between operations members 22 and operations members 32.

Simultaneously with this final work clamping movement of members 32 or an appreciable interval just prior thereto, the crank 48 (which may be operated at variable speed as may be preferred) oscillates ring 46 and through toggles 45 radially reciprocates the punches 42, to pierce registering holes throughout the series required in the rim 12 and flange 13 of the work. The series of operations members 22 as has been said, are in the form of dies and are thereby provided with coacting punch ways 51 and waste discharge channels 52. Thus with one stroke of the common operating head 15 and one stroke of the common oscillating ring 46 all the required holes are punched in the wheel.

The next movement of the parts is a withdrawal of the punches 42 through the reverse oscillation of the ring 46. Simultaneously therewith or immediately following reverse movement of the common operating heads 15 and 38 ensues. The timing can obviously be varied by the skilled mechanic to secure any desired relative timings of the engagements and disengagements, and of the clearances, etc. First pressure upon motivating springs 36 and 25 is relieved, and as it is relieved, the annular series of operating members 32 and 22 are successively disengaged from the work. Still further movement results in a complete taking up of the lost motion between head 15 and the abutment member 18 and the lifting of that member from the work. The cushion pressure of the table 10 automatically applied, causes the work to follow the lifted head 18 either with the work in contact therewith or spaced therefrom a desired degree. It follows until head 15 reaches its uppermost position and the necessary clearance is afforded between pins 19 and the path of exit movement of the work 11 as shown in dotted lines in Fig. 1, whereupon the work is removed by the conveyor (not shown) or by hand.

Thereupon the work is progressed, in the case of the automatic line, by the conveyor to the location of the next order of riveting operations. This order is that of rivet feeding as shown in my co-filed application above referred to. The rivets having been fed into the pierced holes, the work is again progressed to that order of operations having to do with the heading-over of the rivets. The machine performing these heading-over operations is essentially the same in all general respects as the machine just described. Its operating elements are shown in Fig. 5. The internal series 53 corresponding to the internal series 22 is in the form of a series of anvils adapted to receive on their engaging faces the heads 54 of the annular series of rivets which have been fed into the work. The external series of operations members 55 is in the form of clamps essentially similar to the clamps of the series 32 heretofore described. But these clamps carry heading-over punches 56 instead of piercing punches 42. The work engaging ends of these punches 57 are adapted to engage and head-over the outwardly projecting ends of the inserted rivets. The operation of the parts in order and in time relation and clearance are in general the same as those described in connection with the operations of the order of piercing.

Such differences as may be required are well known to those skilled in the art of riveting operations.

What I claim is:

1. A machine for performing riveting operations including a backing member yieldingly moved toward and from the work, and a relatively fixed abutment unyieldingly retaining said backing member in working engagement when moved thereinto.

2. A machine for performing riveting operations including a backing member movable toward and from the work, yielding means operating at an angle to the backing member motion to carry it through its movement, and a relatively fixed abutment unyieldingly retaining said backing member in working engagement when moved thereinto.

3. A machine for performing riveting operations comprising an operating member movable toward and from the work, a yielding wedge means operating at an angle to the motion of the operating member to carry it through its motion, and a relatively fixed abutment acting through the wedge to unyieldingly retain said operating member in working engagement when moved thereinto.

4. A machine for performing riveting operations including a backing member yieldingly moved into and out of engagement with the work, and a relatively fixed abutment unyieldingly retaining said backing member in working engagement.

5. A machine for performing riveting operations comprising a work clamp yieldingly moved into and out of clamping engagement with the work, and a relatively fixed abutment unyieldingly retaining said clamp in working engagement when moved thereinto.

6. A riveting operation machine comprising a clamping member on one side of the work, and a coacting clamping working member on the other side of the work, each yieldingly moved toward and from the work, and relatively fixed abutments coacting respectively with said clamping members to unyieldingly retain said members in working engagement when moved thereinto.

7. A machine for performing riveting operations comprising a work clamp yieldingly moved toward and from the work, a relatively fixed abutment unyieldingly retaining said clamp in working engagement when moved thereinto, and a work punch borne by and operating through said clamp.

8. A machine for performing riveting operations comprising an operating member moved toward and from the plane of the work, yielding means having a positive two-direction connection with said operating member and acting at an angle to the motion of the operating member to carry through its motion, and a relatively fixed abutment unyieldingly retaining said operating member in working engagement when moved thereinto.

9. A machine for performing riveting operations comprising a work clamp yieldingly moved into and out of clamping engagement with the work, a relatively fixed abutment unyieldingly retaining said clamp in engagement with the work, and a toggle operated punch borne by the clamp and operating therethrough.

10. A machine for performing riveting operations in annular series comprising an annular series of backing members on one side of said work, together with an annular series of coacting work clamps on the other side of said work, common means for yieldingly moving said annular series of backing members and clamps toward and from working engagement, and independent means for unyieldingly retaining said backing members and clamps respectively in working engagement when moved thereinto.

11. A machine for performing riveting operations in annular series, comprising an interior annular series of anvils radially reciprocable as respects a series of riveting operations, an annular series of work clamps and punches radially movable as respects the annular series of riveting operations, axially reciprocable means operated in the radial reciprocation of said anvils to commonly radially operate the anvils and the clamps into and out of engagement with the work, and axially oscillatable means commonly actuating the punches.

In testimony whereof I hereunto affix my signature.

JAMES W. HUGHES.